United States Patent
Guan

(10) Patent No.: US 6,577,083 B1
(45) Date of Patent: Jun. 10, 2003

(54) METHOD AND APPARATUS FOR VERTICAL S LINEARITY CORRECTION WITH NO EXTERNAL COMPONENTS

(75) Inventor: Charles Yong Yi Guan, San Francisco, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/973,789

(22) Filed: Oct. 9, 2001

(51) Int. Cl.[7] .................... G09G 1/04; H01J 29/70; H01J 29/72
(52) U.S. Cl. ...................... 315/370; 315/364
(58) Field of Search ............ 324/88, 436; 315/365, 315/368.18, 370, 387, 364

(56) References Cited

U.S. PATENT DOCUMENTS 4,945,292 A * 7/1990 Ackerson et al. .......... 315/387
6,319,822 B1 * 11/2001 Chen et al. ................ 438/637
6,411,098 B1 * 6/2002 Laletin ...................... 324/436

* cited by examiner

*Primary Examiner*—Christine Oda
*Assistant Examiner*—Donald M Lair
(74) *Attorney, Agent, or Firm*—Wagner Murabito & Hao LLP

(57) ABSTRACT

A method and apparatus for vertical S linearity correction with no external components. A periodic waveform may be cubed to produce a second waveform. This second waveform may be sampled to obtain a peak value of the periodic waveform. The peak value may be multiplied by a constant to produce an offset value. The offset value may be subtracted from the second waveform to produce a third waveform. This third waveform may be added to the periodic ramp voltage. Consequently, the periodic waveform is modified by a cubic waveform.

8 Claims, 4 Drawing Sheets

METHOD AND APPARATUS FOR VERTICAL S LINEARITY CORRECTION WITH NO EXTERNAL COMPONENTS

FIELD OF THE INVENTION

Embodiments of the present invention relate to integrated circuit design. More particularly, embodiments of the present invention provide a method and apparatus for providing S correction to a ramp voltage for controlling vertical deflection in a cathode ray tube that can be implemented on an integrated circuit without the need for external components.

BACKGROUND ART

In a cathode ray tube (CRT), such as a computer monitor or television set, an electron beam is swept horizontally and vertically across the screen. A linear ramp voltage is used to drive the vertical deflection yoke to produce the vertical component of the sweep. Because of non-linear behavior in a CRT's vertical deflection system, a ramp with "S" correction is needed to correct its non-linearity. A typical equation describing a vertical ramp output with S correction is:

$$y = DC + a*x + b*x^3$$

where a and b are constants, x is a linear ramp waveform, DC is an offset voltage and y is the S corrected ramp voltage.

In the prior art, analog circuits using multipliers and integrators typically generate the S correction. However, even though complex portions of such circuits may be implemented on integrated circuits, such S correction circuits still require external resistor and capacitor (RC) components.

These external components are required because the resistance and capacitance values and the required tolerances of those values are not commercially feasible to implement in integrated circuits.

Unfortunately, this requirement for external components has many undesirable consequences. Such external components consume many times the printed circuit board area of an integrated circuit, which results in larger circuit implementations, compared with a circuit design which could be implemented entirely in integrated circuits.

Additionally, the external components add significant expense to the implementation of the design (in comparison to a design without external components) in a number of areas:

First, external components contribute their individual component costs; second, external components require additional space, demanding a larger, more expensive printed circuit board; further, building the design requires a longer, more complex, and consequently more expensive printed circuit board assembly and test operation; and finally, external resistors and capacitors also increase manufacturing defect costs and field repair/warranty costs, since greater numbers of interconnects and greater numbers of components decrease reliability.

Clearly, there are numerous financial benefits to reducing or eliminating external components.

A further significant undesirable effect of using an RC network to apply S correction is that such an RC network is fundamentally sensitive to frequency. In many computer monitor designs, it is desirable to change the scan rate, in order to accommodate attachment to different computers, for example, or to change resolution modes.

Changing the scan rate frequency of such a prior art S correction circuit based on RC components will inexorably change the amount of the S correction. Such a change in amount of the S correction will visibly degrade the display image, for example moving picture elements at the beginning and end of a scan line out of alignment with the rest of the line. It is clear that this characteristic of the prior art is highly undesirable.

Therefore, it would be advantageous to provide a method and system providing S correction to a ramp voltage for controlling vertical deflection in a cathode ray tube that can be implemented on an integrated circuit without the need for external components. A further need exists for a circuit design where the amplitude of the S correction does not vary with sweep frequency. A still further need exists for a system and method of controlling the amplitude of the S correction internally to an integrated circuit.

SUMMARY OF THE INVENTION

The present invention provides a method and system for providing S correction to a ramp voltage for controlling vertical deflection in a cathode ray tube that can be implemented on an integrated circuit without the need for external components. Embodiments provide a circuit design in which the amplitude of the S correction does not vary with sweep frequency. Further embodiments provide for a system and method of controlling the amplitude of the S correction internally to an integrated circuit.

A method and apparatus for vertical S linearity correction with no external components is disclosed. A periodic waveform may be cubed to produce a second waveform. This second waveform may be sampled to obtain a peak value of the periodic waveform. The peak value may be multiplied by a constant to produce an offset value. The offset value may be subtracted from the second waveform to produce a third waveform. This third waveform may be added to the periodic ramp voltage. Consequently, the periodic waveform is modified by a cubic waveform.

DETAILED DESCRIPTION OF THE INVENTION

In the following detailed description of the present invention, a method and apparatus for vertical S linearity correction with no external components, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions, which follow (e.g., process 100 and electrical circuits 200, 300, 400 and 500), are presented in terms of procedures, steps, processing, and other symbolic representations of operations on electrical currents and voltages. These descriptions and representations are the means used by those skilled in the electronic and semiconductor arts to most effectively convey the substance of their work to others skilled in the art. The steps are those requiring physical manipulations of physical quantities. Usually, though not necessarily, these quantities take the form of electrical or magnetic signals capable of being stored, transferred, combined, compared, amplified and otherwise manipulated by electronic circuits. It has proven convenient at times, principally for reasons of common usage, to refer to these signals as waveforms, values, symbols, clocks, or the like. For similar reasons, it has also proven convenient to refer to electronic circuit elements by the function that they perform.

It should be borne in mind, however, that all of these and similar terms are to be associated with the appropriate physical quantities and are merely convenient labels applied to these quantities.

METHOD AND APPARATUS FOR VERTICAL S LINEARITY CORRECTION WITH NO EXTERNAL COMPONENTS

The present invention is described in the context of an integrated circuit as would be used in a cathode ray tube device. However, it is appreciated that the present invention may be utilized in other types of electronic circuits that would be desirable to realize on an integrated circuit device.

Figure 1:
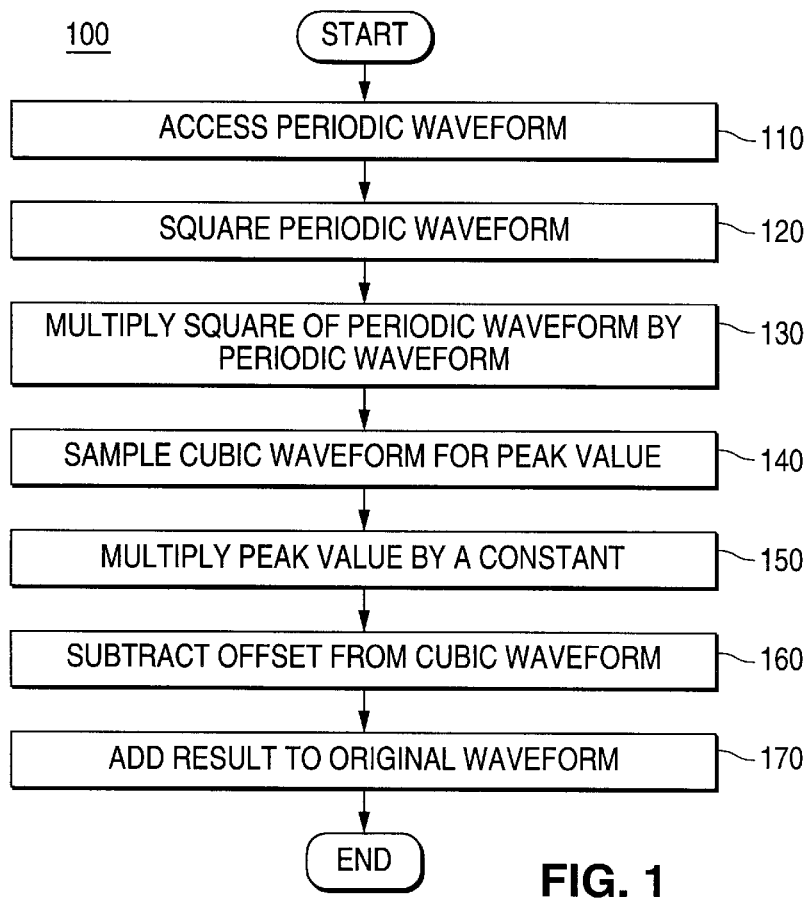
FIG. 1 is an illustration of a method for processing a periodic waveform according to an embodiment of the present invention.

FIG. 1 is an illustration of a method 100 for processing a periodic waveform according to an embodiment of the present invention.

In step 110, a periodic waveform may be accessed, for example, at the input of an electronic circuit.

In step 120, that periodic waveform may be squared. It is appreciated that this operation may be implemented in a variety of well known circuits that may be implemented on an integrated circuit.

Figure 5:
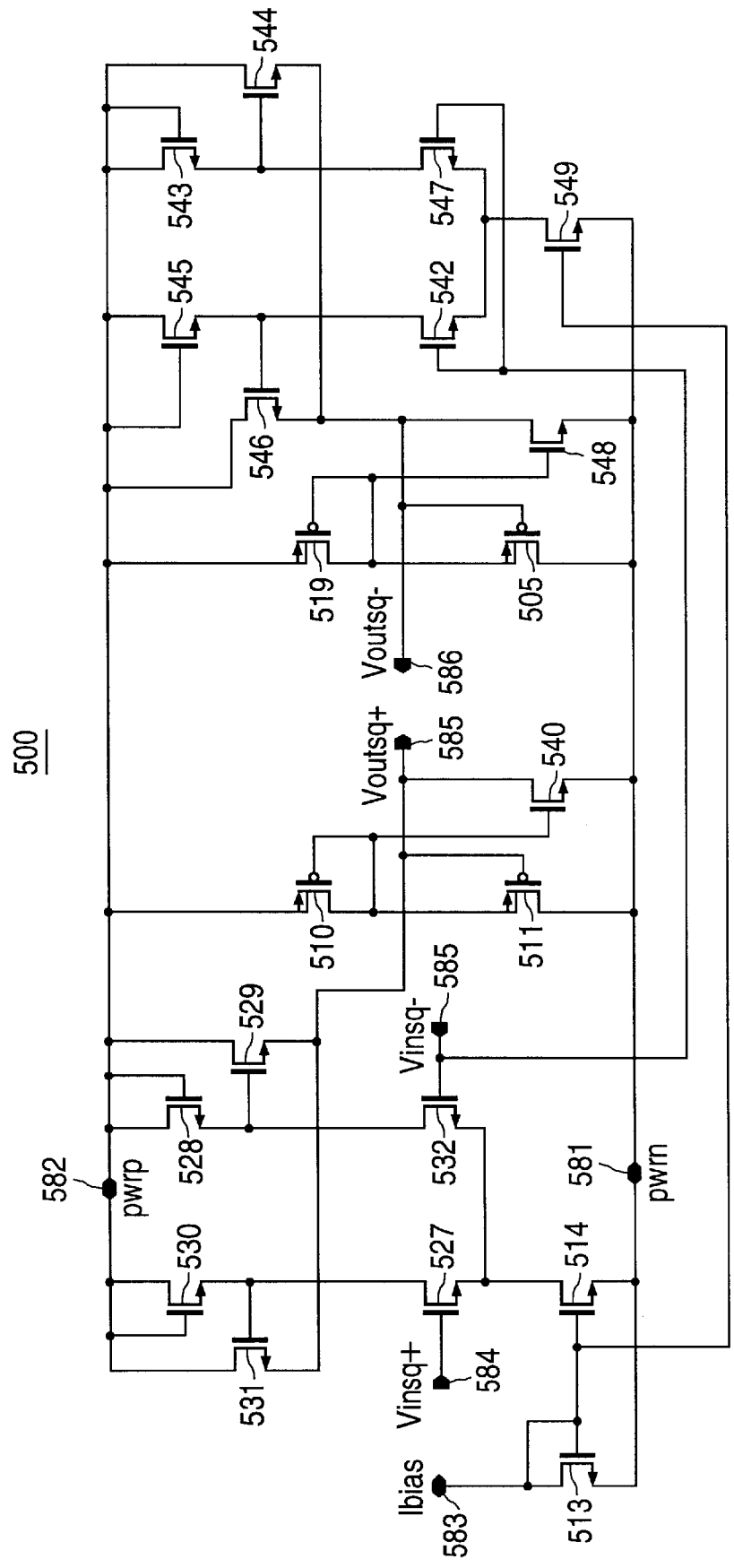
FIG. 5 depicts a circuit for squaring a periodic waveform according to an embodiment of the present invention.

FIG. 5 depicts a circuit 500 for squaring a periodic waveform according to an embodiment of the present invention. Voltage 582 is the positive voltage rail providing power to the circuit. Voltage 581 is the negative voltage rail powering the circuit. This circuit is designed using metal oxide semiconductor (MOS) devices.

A ramp signal may be applied to the input node 584 (Vinsq+) and a DC component applied to node 585 (Vinsq−).

Still referring to FIG. 5, MOS device 527 and MOS device 532 form a differential amplifier with MOS device 530 and MOS device 528 as its load. Its gain is $(W/L)_{530}/(W/L)_{528}=1$. The outputs of the differential amplifier are applied to the gates of MOS device 529 and MOS device 531. MOS device 529 and MOS device 531 take the two output voltages and convert them into a squared current. This current, in turn, is converted into a squared voltage through the MOS resistor 540. MOS device 510 and MOS device 511 bias MOS device 540 into its linear resistor region.

The circuit block previously described is then duplicated (see MOS devices 505, 519, 542, 543, 544, 545, 546, 547, 548 and 549 in FIG. 5) to create fully differential square output voltages, i.e., voltage 585 (Voutsq+) and voltage 586 (Voutsq−). In this manner, the square output voltage is independent of the common mode voltage applied at node 585. The differential squaring output, (Voutsq+−Voutsq−)= Voutsq, is proportional to Vout' where Vout' is equal to $$Vout'=(Vout-Vcom)^2=(VDC+25*lamp*t-VDC-25*lamp*0)^2= (25*lamp*t)^2$$

The proportional constant k1 is given by $$k1=\tfrac{1}{5}*(W/L)_{531}/(W/L)_{540}=\tfrac{1}{5}*48=9.6$$

Notice that Vout' is proportional to $(lamp*t)^2$.

Figure 4:
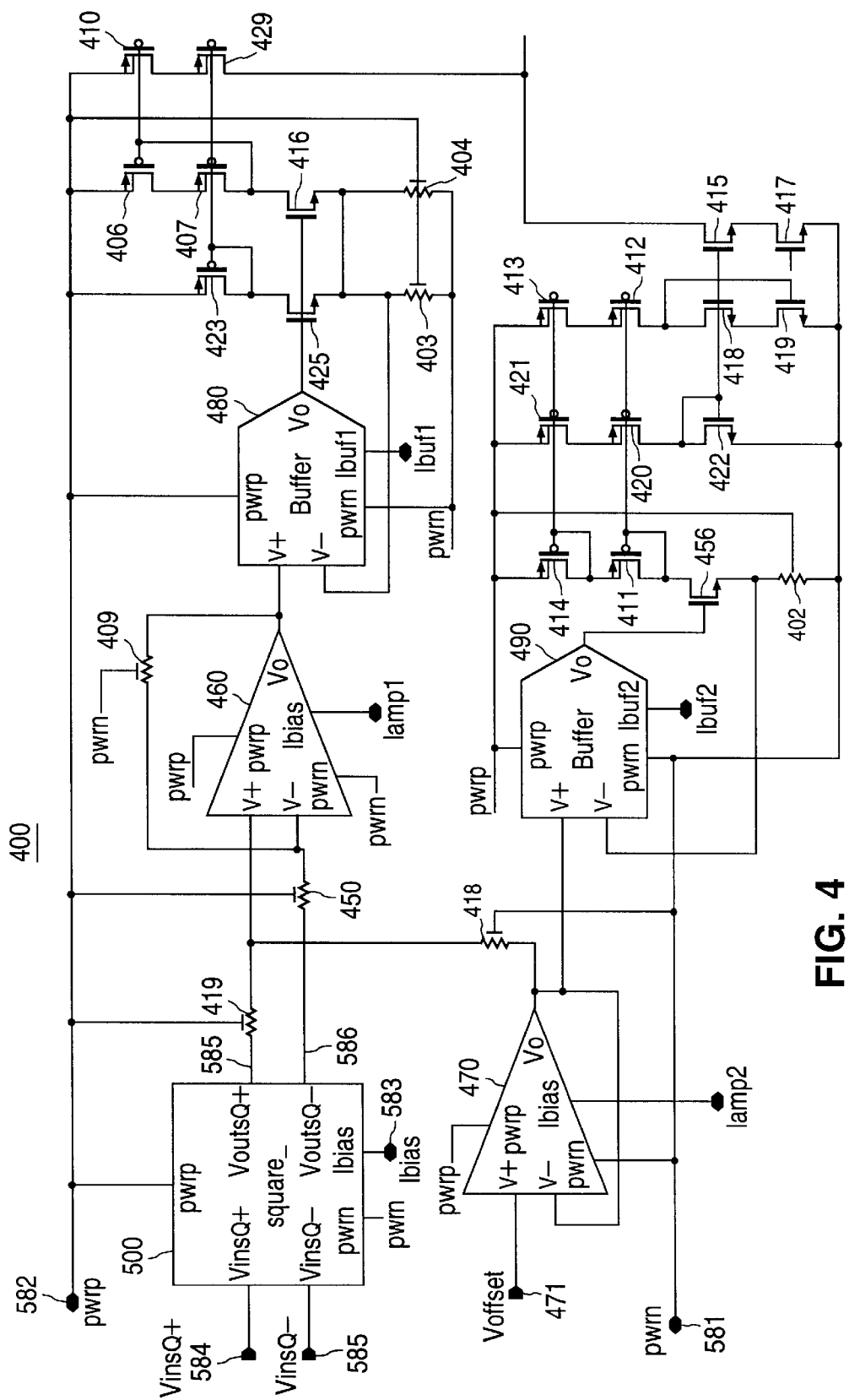
FIG. 4 depicts a circuit for converting a squared voltage output into a current according to an embodiment of the present invention.

FIG. 4 depicts a circuit 400 for converting the squared voltage output from circuit 500 into a current according to an embodiment of the present invention. Voltage 582 is the positive voltage rail providing power to the circuit. Voltage 581 is the negative voltage rail powering the circuit. This circuit is designed using metal oxide semiconductor (MOS) devices.

The voltages 585 (Voutsq+) and 586 (Voutsq−) go through a differential amplifier stage. This stage consists of operational amplifier 460, resistor 419, resistor 418, resistor 450 and resistor 409. Its main purpose is to convert the differential output square voltage 585 (Voutsq+) and voltage 586 (Voutsq−) into a single ended output. It has a gain of resistance ratio 409/450 provided that 419=450 and that 418=409. Importantly, resistor 409 and resistor 450 are different types of resistors. Resistor 409 has a higher temperature coefficient than resistor 450. The square circuit 500 has a negative temperature coefficient. The gain resistance ratio of R409/R450, which has a positive temperature coefficient, will compensate for the square circuit's negative temperature coefficient. One can theoretically have a zero temperature coefficient square signal at the output of operational amplifier 460 by adjusting the gain resistance ratio of 409/450.

Still referring to FIG. 4, voltage 471 (Voffset) is buffered by operational amplifier 470 and applied to the non-inverting input of operational amplifier 460 through resistor 418. The output of operational amplifier 460 is then given by (resistance ratio of 409/450)*Voutsq+Voffset. In this manner operational amplifier 460 will still be in the proper operating range even when Voutsq+=Voutsq−. Voltage 471 (Voffset) in this case is a bandgap voltage of 1.2 volts. The offset voltage, Voffset, also biases the two buffers, buffer 480 and buffer 490, into the proper operating range. Buffer 480, MOS device 425, and resistor 403 form a voltage to current converter. The current equal the voltage at the input of buffer 480 divided by resistor 403. Since the output of operational amplifier 460 is the input of buffer 480, the current is equal to [R409/R450*Voutsq+Voffset]/R403.

This current is then mirrored through the current mirrors formed by MOS device 416, resistor 404, MOS device 425, resistor 403, MOS device 423, MOS device 406, MOS device 407, MOS device 410 and MOS device 429 to Isqr. The amount of current through MOS device 429 sources to Isqr is [R409/R450*Voutsq+Voffset]/R403. Similarly, buffer 490, MOS device 456 and resistor 402 convert voltage 471 (Voffset) into a current. This current, voltage 471 (Voffset) divided by the resistance of resistor 402, is then mirrored to Isqr through the current mirrors formed by MOS device 411, MOS device 414, MOS device 421, MOS device 420, MOS device 413, MOS device 412, MOS device 422, MOS device 419, MOS device 418, MOS device 417, and MOS device 415. The amount of current through MOS device 415 sinks to Isqr is Voffset/R402. Since R402=R403, the net current Isqr is proportional to Voutsq=(Voutsq+−Voutsq−), which is proportional to Vout'. As mention before, Vout' is proportional to (lamp*t)^2. Therefore, Isqr is also proportional to (lamp*t)^2. The proportional constant is given by $$k2=R409/R450*(1/R403)*k1 \approx 4.68e-3$$

since R409=30 k ohms, R450=5 k ohms, R403=12.3 k ohms, k1=9.6. Thus, Isqr=k2*(lamp*t)^2.

In step 130, a second order waveform output from step 120 may be multiplied by the original waveform to produce a third order, or cubic, waveform. It is appreciated that this multiplication may be implemented in a variety of well known circuits that may be implemented on an integrated circuit.

In step 140, a cubic waveform may be sampled to determine its peak value. It is appreciated that this sampling may be implemented in a variety of well known circuits that may be implemented on an integrated circuit.

In step 150, a peak value of the cubic waveform is multiplied (scaled) by a constant. In a preferred embodiment of the present invention, this constant is 0.25. It is appreciated that this scaling may be implemented in a variety of well known circuits that may be implemented on an integrated circuit.

In a preferred embodiment, step 140 and step 150 are performed by electronic circuit 299, described below.

In step 160, a DC offset of the cubic waveform may be subtracted (removed) from the cubic waveform. Since subtraction may be expressed as the addition of a negative value, an adder circuit usually implements this operation. It is appreciated that an adder may be implemented in a variety of well known circuits that may be implemented on an integrated circuit.

In step 170, the cubic waveform without DC offset may be added to the original periodic waveform. It is appreciated that an adder circuit may implement this operation.

In an embodiment of the present invention, the periodic waveform is a ramp voltage for controlling vertical deflection in a cathode ray tube.

In another embodiment of the present invention, the waveform resulting from process 100 is a ramp voltage with S linearity correction for controlling vertical deflection in a cathode ray tube.

Figure 2:
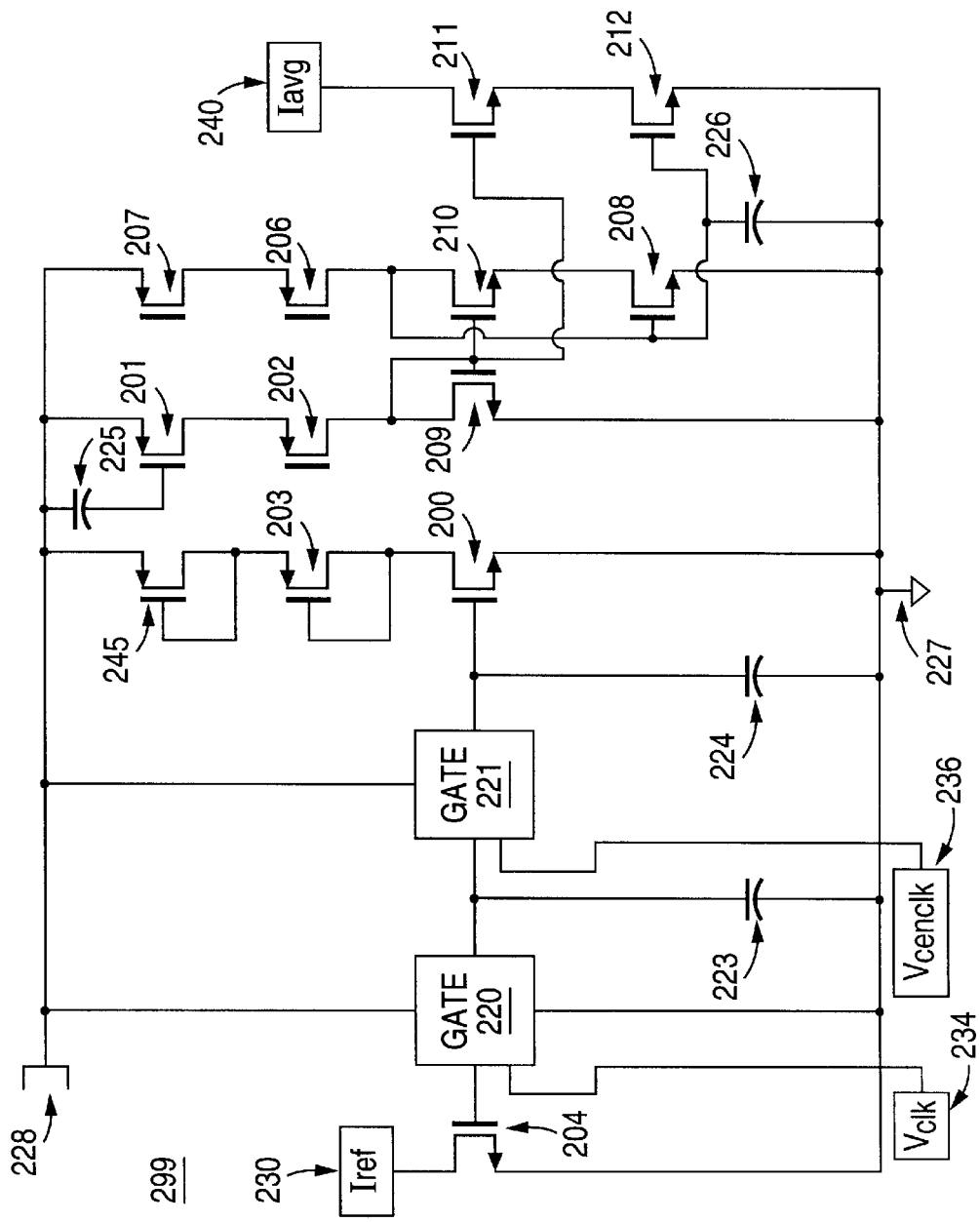
FIG. 2 is a diagram illustrating elements of an electronic circuit for determining the average value of a cubic periodic current waveform, according to an embodiment of the present invention.

FIG. 2 is a block diagram illustrating elements of an electronic circuit 299 for determining the average value of a cubic periodic current waveform, according to an embodiment of the present invention.

Voltage 228 is positive power rail for use by elements of circuit 299, and voltage 227 is a negative power rail for use by elements of circuit 229.

Reference current 230 is a cubic periodic waveform. Reference current 230 is generated by well known methods, which can be implemented on an integrated circuit, outside of the scope of the present invention.

The average value of periodic cube function is $$\text{Avg.}=1/T*\int_o^T(a*t^3)*dt=1/T(a/4*T^4)=(1/4)*a*T^3$$

where 'a' is a constant.

From the above result, it may be seen that the average value of a cubic function is ¼ of the peak value of that function. Hence, to determine the average value of a cubic waveform, the peak value may be sampled and multiplied by 0.25. This is of interest because S linearity correction of a vertical deflection voltage for a CRT requires a cubic term, as expressed by the previous equation:

$$y=DC+a*x+b*x^3.$$

In order to use this term, any DC offset introduced in the process of forming the cubic waveform must be eliminated.

Referring to FIG. 2, current 230 is applied to the drain of NMOS device 204. The peak of current 230 occurs at the start of the base waveform, from which the cubic waveform is derived. This occurs when clock signal 234 is high. Reference current 230 is converted to a voltage via NMOS device 204. This voltage is sampled by gate 220 when clock signal 234 is high, and held on capacitor 223.

Clock signal 236 is asserted high halfway through the period of the base waveform. Clock signal 236 causes gate 221 to pass the voltage on capacitor 223 to the gate of NMOS device 200. Consequently, the current through NMOS device 200 is the peak current of reference current 230.

MOS devices 201, 202, 203, 245 and capacitor 225 scale this current by a constant value. In an embodiment of the present invention, this scaling factor is a multiplication by 0.25.

MOS devices 206, 207, 208, 209, 210, 211, 212 and capacitor 226 then mirror the scaled current to produce average current 240.

It is appreciated that capacitors 223, 224, 225 and 226 are commercially feasible to produce on an integrated circuit. As used in circuit 229, the capacitance values of capacitors 223–226 may be less than 20 picofarads. Further, the circuit may be designed to operate with tolerances of at least plus or minus 20 percent of the nominal capacitance value.

In an embodiment of the present invention, reference current 230 corresponds to a periodic ramp voltage generated to control the vertical deflection in a cathode ray tube.

In another embodiment of the present invention, average current 240 is used to remove DC bias from reference current 230.

Figure 3:
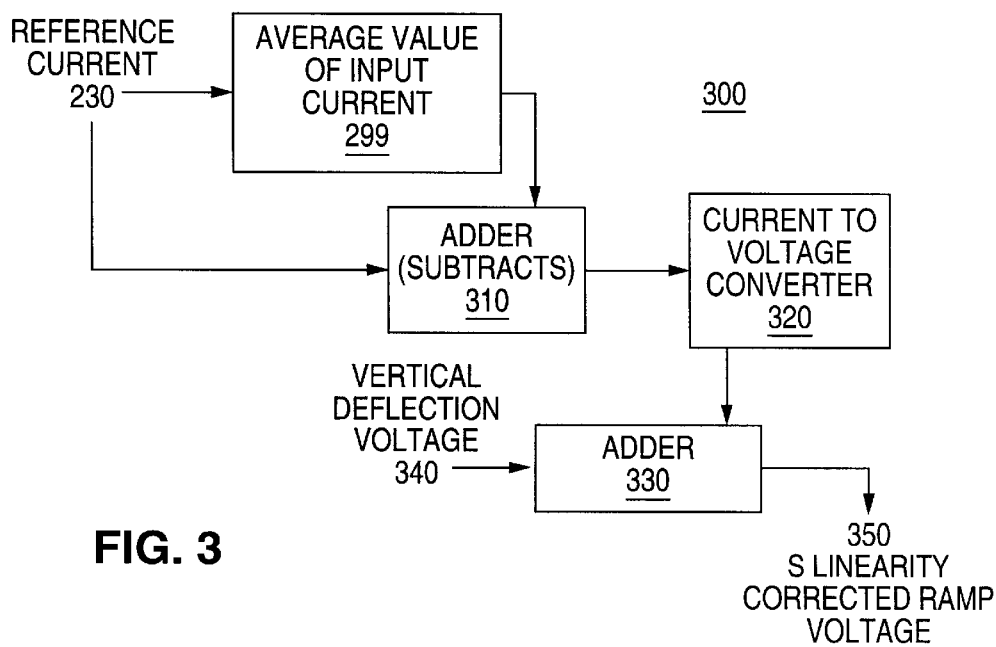
FIG. 3 is a block diagram illustrating elements of an electronic circuit for producing an S linearity corrected ramp voltage for controlling the vertical deflection of a cathode ray tube, according to an embodiment of the present invention.

FIG. 3 is a block diagram illustrating elements of an electronic circuit 300 for producing an S linearity corrected ramp voltage for controlling the vertical deflection of a cathode ray tube, according to an embodiment of the present invention.

Reference current 230 is the current waveform corresponding to the cube of vertical deflection voltage 340. Current 230 and voltage 340 are generated by well known methods, which can be implemented on an integrated circuit, outside of the scope of the present invention.

Circuit 299 processes current 230 to produce the average value, or DC offset, of current 230. Adder 310 subtracts the average value of current 230 from current 230, to produce a true AC waveform with no DC component. It appreciated that adder 310 may be realized by a variety of well known designs, which can be implemented on an integrated circuit, in accordance with embodiments of the present invention.

Current to voltage converter 320 converts the current output of adder 310 to a voltage. The output of current to voltage converter 320 is an S linear correction voltage waveform. It appreciated that current to voltage converter 320 may be realized by a variety of well known designs, which can be implemented on an integrated circuit, in accordance with embodiments of the present invention.

Adder 330 may superimpose an S linear correction voltage waveform onto vertical deflection voltage 340, producing an S linearity corrected ramp voltage 350, which may be used to control the vertical deflection of a cathode ray tube. It appreciated that adder 340 may be realized by a variety of well known designs, which can be implemented on an integrated circuit, in accordance with embodiments of the present invention.

The preferred embodiment of the present invention a system and method for vertical S linearity correction with no external components is thus described. While the present invention has been described in particular embodiments, it should be appreciated that the present invention should not be construed as limited by such embodiments, but rather construed according to the below claims.

What is claimed is:

1. A method of processing a periodic waveform comprising:

cubing said periodic waveform to produce a second waveform;

sampling a peak value of said second waveform;

multiplying said peak value by a constant to produce an offset value;

subtracting said offset value from said second waveform to produce a third waveform; and adding said third waveform to said periodic waveform.

2. The method of claim 1 wherein said periodic waveform is a ramp voltage for controlling vertical deflection in a cathode ray tube.

3. The method of claim 1 wherein said constant is 0.25.

4. The method of claim 1 wherein said processing produces a ramp voltage with s linearity correction for controlling vertical deflection in a cathode ray tube.

5. An electronic circuit for determining the average value of an applied current waveform comprising:

an input for accessing said current waveform;

a sample and hold circuit coupled to said input for determining the peak value of said current waveform;

a current scaling circuit coupled to said sample and hold circuit for scaling the peak value of said current waveform;

an output coupled to said current scaling circuit, wherein said output is the average value of a current applied to said input; and wherein said output is one quarter of the peak current of a current applied to said input.

6. An electronic circuit for determining the average value of an applied current waveform comprising:

an input for accessing said current waveform;

a sample and hold circuit coupled to said input for determining the peak value of said current waveform;

a current scaling circuit coupled to said sample and hold circuit for scaling the peak value of said current waveform;

an output coupled to said current scaling circuit, wherein said output is the average value of a current applied to said input; and wherein a current applied to said input is the cube of a periodic ramp voltage, wherein said periodic ramp voltage is generated to control the vertical deflection in a cathode ray tube.

7. An electronic circuit for determining the average value of an applied current waveform comprising:

an input for accessing said current waveform;

a sample and hold circuit coupled to said input for determining the peak value of said current waveform;

a current scaling circuit coupled to said sample and hold circuit for scaling the peak value of said current waveform;

an output coupled to said current scaling circuit, wherein said output is the average value of a current applied to said input;

a first adder coupled to said output for adding two current waveforms;

a current to voltage converter coupled to said first adder for converting a current waveform to a voltage waveform; and a second adder coupled to said current to voltage converter for adding two voltage waveforms;

wherein said output is added to said input in said first adder, producing an AC current waveform, which is converted to a voltage waveform by said current to voltage converter; and wherein said voltage waveform is added to a vertical deflection voltage by said second adder, producing an s linearity corrected ramp voltage to control the vertical deflection of a cathode ray tube.

8. The electronic circuit of claim 7 realized on an integrated circuit.

* * * * *